J. V. WOOLSEY.
Wheels for Vehicles.

No. 157,055.  Patented Nov. 17, 1874.

Witnesses:  Inventor.

UNITED STATES PATENT OFFICE.

JOHNSTON V. WOOLSEY, OF SANDUSKY, OHIO.

IMPROVEMENT IN WHEELS FOR VEHICLES.

Specification forming part of Letters Patent No. 157,055, dated November 17, 1874; application filed October 3, 1874.

*To all whom it may concern:*

Be it known that I, J. V. WOOLSEY, of Sandusky, in the county of Erie and State of Ohio, have invented a certain new and Improved Carriage-Wheel; and I do hereby declare that the following is a full, clear, and complete description thereof, reference being had to the accompanying drawings making a part of the same.

Figure 1:
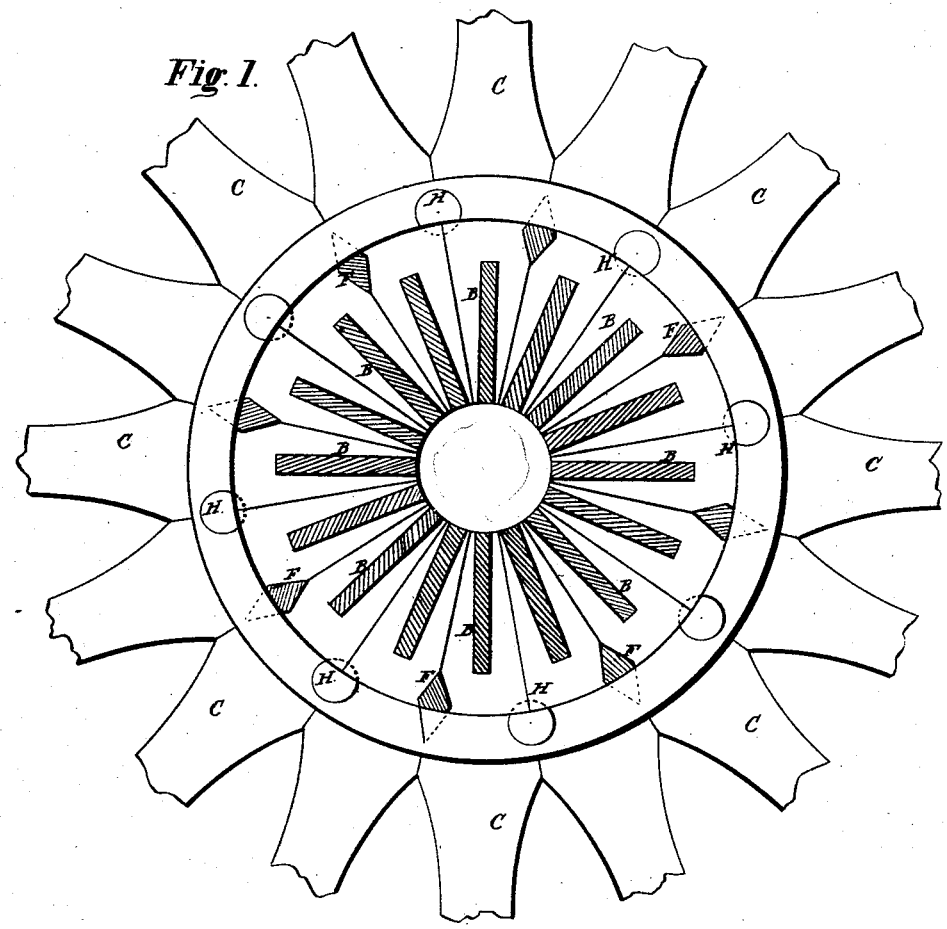
Figure 2:
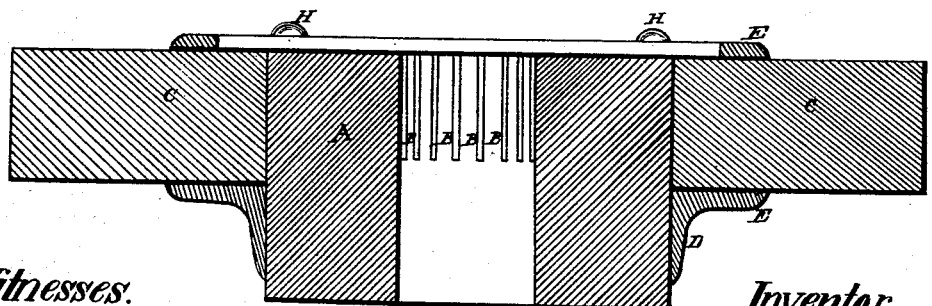

Figure 1 is a transverse section of the carriage-wheel hub. Fig. 2 is a longitudinal section.

Like letters of reference refer to like parts in the several views.

The nature of this invention relates to the manner of securing spokes of a wheel in the hub thereof by means of a series of rectangular radial tongues formed in the hub, which are made to fit in corresponding notches cut in the ends of the spokes, substantially in the manner as follows:

In the drawing, A represents a wheel-hub, made of wood, and of the ordinary shape. In and around the middle of said hub is cut a series of radial rectangular tongues or tenons, B, corresponding in number to the number of spokes of which the wheel may be composed. C are the spokes, in the hub ends of which is cut a notch corresponding in character to the rectangular tongues B, into which they are received, as shown in Fig. 1. In said figure it will be seen that the sides of the spokes touch each other, and are supported and braced on each side by a band, D, provided with a flange or collar, E. The two flanges are connected to each other by a series of bars, F, thereby making of the bands, collars, and bars one piece. A portion of the band on one side of the hub is cut away, in order to show the inside of the hub, so that the relation of the radial tongues to the spokes may be seen. In one side of each spoke is cut a notch corresponding to the angle of the bars F, against which the spokes rest, which, by the help of the collars, are supported in their relation to each other, and, being driven into the hub, mutually brace and wedge themselves therein. For a proper fitting of the spokes in the spaces between the bars, and in the notches, two spokes should be driven at the same time. This not only secures a close fitting of the spokes, but will prevent them from crowding too hard on the sides of the bars while being driven in. The spokes are prevented from working out from the hub by the rods or bolts H, which pass through the spokes in the line of their contact, so that one half of the bolt or rod is in one spoke and the other half in the spoke adjoining, as shown in Fig. 1, thus securely holding the spokes in place.

What I claim as my invention, and desire to secure by Letters Patent, is—

The combination of the radial rectangular tongues B, spokes C, having corresponding notches for the admission of said radial tongues, bolts H, and band, consisting of the bands D, collars E, and bars H, all of one piece, substantially as and for the purpose specified.

JOHNSTON V. WOOLSEY.

Witnesses:
J. H. BURRIDGE,
A. F. CORNELL.